A. MUTSCHELLER
Dec. 20, 1932. VACUUM TUBE DISCHARGE DEVICE Re. 18,694
Original Filed May 13, 1922
FIGURE 1
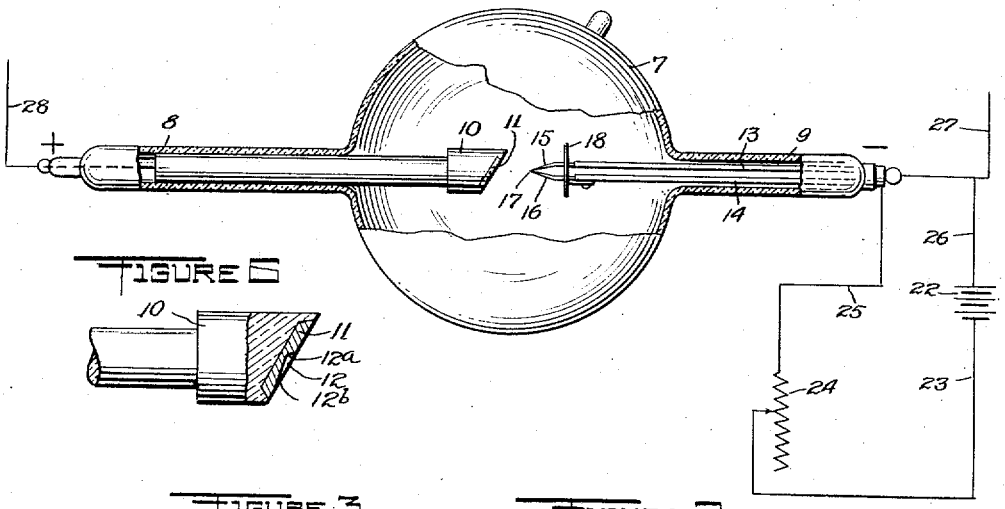
FIGURE 6
FIGURE 3
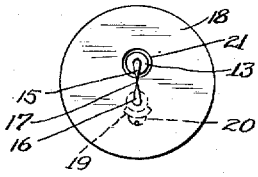
FIGURE 2
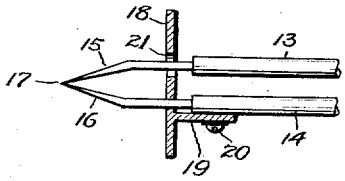
FIGURE 5
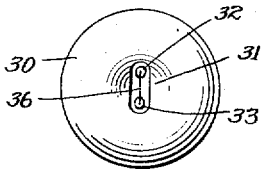
FIGURE 4
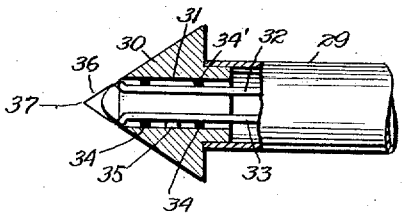
WITNESS,
M. E. Lessin
INVENTOR
Arthur Mutscheller
BY Walton Harrison,
ATTORNEY Reissued Dec. 20, 1932

Re. 18,694

UNITED STATES PATENT OFFICE

ARTHUR MUTSCHELLER, OF NEW YORK, N. Y., ASSIGNOR TO WAPPLER ELECTRIC CO., INC., OF LONG ISLAND CITY, NEW YORK, A CORPORATION OF NEW YORK

VACUUM TUBE DISCHARGE DEVICE

Original No. 1,738,959, dated December 10, 1929, Serial No. 560,545, filed May 13, 1922. Application for reissue filed September 17, 1930. Serial No. 482,631.

My invention relates to vacuum tube discharge devices: that is, to cathodes and parts immediately associated therewith constructed and arranged with a view to controlling electrical discharges through vacuum tubes.

More particularly stated my invention comprehends a vacuum tube discharge device for use in a highly evacuated tube and is suitable, for instance, for use in X-ray work.

At one time it was generally believed in this art that electricity is incapable of traversing space in a very high vacuum, but it was afterward shown that by using a certain specific form of negative electrode and a sufficiently high potential such as that from an ordinary Ruhmkorff coil, a discharge could be forced through the tube. It was also observed that large quantities of X-rays were produced if the electrodes were near enough together and the cathode was provided with a point sufficiently sharp. It was further observed that the better the vacuum the greater the intensity of X-rays produced and sent out. These observations therefore brought out mainly the fact that the point of the cathode should be very sharp; that is, that the angle between the longitudinal axis of the cathode and the adjacent sloping side of the cathode must be very small. Otherwise a discharge will not take place, at least not unless a very high voltage is applied. Such being the case, it follows that the control of the discharge depends mainly upon the sharpness of the point or edge of the negative electrode.

Then there is known in this art an X-ray tube of the so-called hot cathode or Coolidge type. This tube has a cathode to be heated which is in the form of a disc or flat coil and the discharge from it at saturation is independent of the voltage applied to its electrodes. This and all other known hot cathode type tubes therefore have a saturation condition or rigid and inelastic characteristics.

I have made the discovery that if the negative electrode is cone shaped or knife shaped, and the angle of the point of the cone is so large (or in other words if the point of the cone is so blunt) that a large discharge variable with the voltage and at a normal voltage does not take place, a discharge of any desired magnitude can be obtained if the sharp edge of the cathode is heated. Also, that the degree of heat required in such a pointed cathode used for this purpose, in order to obtain a discharge of predetermined magnitude, is less than would be required for an equivalent discharge by use of a heated negative electrode, the end of which is flat, round or helical. The same principle holds good if the cathode have a sharp edge like that of a knife blade, instead of a point.

By taking advantage of the foregoing observations I have produced an improved vacuum tube discharge device possessing various advantages over other discharge devices heretofore known, and particularly over those using so-called thermo-electronic or thermo-ionic principles.

Among the advantages of my device are the following:

I. It enables much larger discharges to be obtained than would be practicable with a cathode in which the cathode point, no matter how small or how fine it may be, is cold.

II. It enables the effective temperature of the cathode, with its sharp point heated, to be maintained considerably lower than would be required for equal discharges from a cathode the end of which is flat, round or helical.

III. It dispenses with the necessity for an electrostatic focusing device for many purposes, although for other purposes one may be used.

IV. The discharge produced is dependent upon the voltage applied to the electrodes, so that my device in its action is much less irregular than a device of the kind in which the discharge is independent of the voltage. Therefore, changes or variations in either both the cathode heating or the discharge current are less disturbing upon the general functioning of the elastic discharge device of my invention.

V. By using cathodes of varying degrees of sharpness, it is practicable, with a given cathode temperature, to obtain discharges varying considerably in volume and thus of developing a great variety of current-voltage characteristic curves.

Reference is made to the accompanying drawing forming a part of this specification, and in which like reference characters indicate like parts throughout all of the figures.

Figure 1 is a side view, partly in section and partly diagrammatic, showing one form of my device as incorporated in an X-ray tube.

Figure 2 is a fragmentary section showing the X-ray tube cathode and parts immediately associated therewith.

Figure 3 is an end elevation of the cathode and parts immediately associated therewith appearing in Figure 2.

Figure 4 is a section showing a form of cathode made in accordance with my invention, but different from the form appearing in Figures 1 to 3 inclusive.

Figure 5 is an end elevation of the cathode and parts immediately associated therewith shown in Figure 4.

Figure 6 is a fragmentary section showing an improved anode adapted for use with either form of my improved cathode.

An X-ray tube appears at 7, and is provided with an anode neck 8 and a cathode neck 9, these parts being of the usual or any preferred construction. The anode is shown at 10, and is made of copper or other suitable metal. It carries a target face 11, made of tungsten and it may be flat or provided with a concavity 12 of the form shown. This concavity 12 has a portion 12[a] with a rather sharp curvature, and also has a portion 12[b] which has relatively little curvature and is so disposed that X-rays, originating in the portion 12[a], have an unobstructed path directly downward from their point of origin. This arrangement facilitates the equal distribution of the X-rays downwardly, and has a tendency to render them equally dense per unit of area exposed.

Mounted within the cathode neck 9 are two cathode members 13, 14, provided respectively with portions 15, and 16 of reduced diameter, these portions being tapered off thin and meeting at a sharp point 17, so that the cross section of the reduced portions 15 and 16 is very small in immediate proximity to the point 17. The superficial angle made by the meeting of the portions 15 and 16 is acute, preferably 45 degrees or less, as may be understood from Figures 1 and 2.

A metallic plate 18, made preferably of aluminum, is provided with a supporting flange 19, the latter being secured to the stem 14 by means of a screw 20 or other appropriate fastening. The portion 16 extends through a hole in the plate 18, into which it fits tightly. The portion 15 extends through a hole 21 in the plate, this hole being of a diameter somewhat larger than that of the portion 15, so as to leave a clearance all around it, as may be understood from Figures 2 and 3.

A battery is shown at 22, and is used for supplying current to heat the point 17, as hereinafter described. A wire 23 is connected with the battery 22 and leads therefrom to a variable resistance 24. From this variable resistance a wire 25 leads to the stem 13. The stem 14 is connected with a wire 26, leading to the battery 22. A wire 27 is connected with the wire 26, and constitutes one of the main leads of the X-ray tube, the other of these leads being connected with the anode 10 and being shown at 28.

The battery circuit, used for heating the point 17, may be traced as follows: battery 22, wire 23, variable resistance 24, wire 25, stem 13, point 17, stem 14 and wire 26, back to battery 22.

In the form of cathode shown in Figures 4 and 5, I provide a metallic tube 29 carrying, a conical member 30 of metal. This member has a slot 31 extending through it in the direction of its axis. Located within the slot 31 are a pair of metallic conductors 32 and 33. Supporting members 34, made of insulating material extend inwardly from the conical member 30 and brace the same relatively to the stems 32 and 33, and a metallic connection 35 is made from the conductor 33 to the conical member 30. A fine wire 36, or conducting filament, extends from one of these stems to the other, and is provided with a portion 37, bent to an acute angle and extending out from the slot 31 so that the point 37 is both the apex of the conical member 34 and the heated sharp point of the cathode.

The conical member 30, though preferably of aluminum, may be made of any metal known in this art as non-sputtering metal. The wire 37 may be made of tungsten, platinum, molybdenum, tantalum, or any other metal sufficiently refractory. This is also true of the conductors 32 and 33, and especially the portions thereof leading out to the point 37. If desired, instead of the member 36 being a wire, it may be a filament of any other material suitable for use in a highly evacuated vessel and capable of withstanding the effects of the heating and of the discharges.

The plate 18, arranged as indicated in Figures 2 and 3, and also the form of cathode shown in Figures 4 and 5, appear to be of material assistance in facilitating the main discharge, and also in focusing and directing the same.

The point 17 or 37, as the case may be, is located at any suitable distance from the anode 10, depending upon the method employed for focusing the discharge or the shape and size of the focusing shield employed for the purpose of obtaining the desired small focal area, but is preferably spaced therefrom to such an extent that the point is not less than two milimeters nor for ordinary purposes more than ten millimeters from the concavity 12ª shown in Figure 6. This distance may be greater in X-ray tubes which have flat targets or which are used with the higher voltages employed for deep therapy.

With the sharp point 17 or 37 properly shaped, and heated as above described, a main discharge of predetermined proportions may be brought about by the use of a temperature or emitting area considerably lower or by an emitting area much smaller than is ordinarily required to produce a like discharge by the use of a heated cathode having a helical or spiral form—such, for instance, as has heretofore been used in X-ray tubes of the Lilienfeld type and of the Coolidge type.

The two specific forms of cathode above described are merely typical of my invention, as I contemplate using a cathode having any suitable form in which there is a sharp portion of any desired shape and heated in any of the ways known in the art. As may be understood from Figures 3 and 5, the point 17 or the point 37 is not only a point serving the apex of a cone, but is also a sharp edge somewhat resembling that of a knife blade.

It will be noted that, owing to the form of the tungsten target face 11 of the anode 10, the X-rays are produced within the concavity 12ª, and in radiating downwardly from this point of origin they are not obstructed, and are therefore substantially uniform per unit of area to which they are exposed.

The operation of my device may be readily understood, in the light of the prior art, from the foregoing description.

The tube is connected up with a suitable source of current of high potential, and aside from the distinctions herein pointed out, is used in substantially the same manner as any other X-ray tube of high power.

The fundamental difference between my improved vacuum tube and those of the prior art may be illustrated as follows: By taking readings of the milliamperes of currents passing through the tube in the main discharge, and of the voltage across the main terminals of the tube, and plotting the logarithms of the values thus observed, it will be found that these values, in the case of gas tubes, are generally located along a straight line the slope of which is very close to an angle with the log V line the tangent of which has a value very close to 2. Thus its characteristic may be expressed approximately as $\log ma = 2 \log V + c$.

Plotted in the same manner, the readings obtained from a tube of the Coolidge type operated above its saturation point, are represented by a straight line, the angle of which with the log V line is ordinarily of zero value; that is; parallel with the log V line.

This indicates an inflexible system, independent of the voltage applied under operating conditions. When, however, the data is plotted in the same way with my improved tube, there is obtained a straight line the slope of which may be any value from zero to any intermediate value up to the full value of two, or even a high value. This means that beginning with a very blunt cathode corresponding to the kind generally employed in the Coolidge tube, and making the cathode point successively sharper and sharper, I obtain any desired curve slope, and therefore greater adaptability than is ordinarily obtainable, even by use of a gas tube.

It follows, therefore, that my improved X-ray tube possesses the so-called elastic characteristics of the gas tube instead of the so-called inflexibility of the Coolidge tube; and in addition, my tube possesses further adaptability in that by varying the superficial angle of the heated point, or in other words by rendering the cathode point blunt or sharp, the operating characteristics may be readily varied, predetermined and standardized.

While my device is well adapted for use as an X-ray tube as above described, it may be employed to advantage in vacuum tubes of all kinds, such as rectifiers, amplifiers, audions, pliotrons, kenotrons, and generally speaking in all forms of valve tubes.

I do not limit myself to the precise structure shown, as variations may be made therefrom without departing from my invention, the scope of which is commensurate with my claims.

I claim:

1. In a discharge device the combination with a highly evacuated vessel of an anode with great active area and a filamentary cathode having portions converging to a point whose cross sectional area is a minimum compared to said converging portions.

2. In a discharge device an anode and a filamentary cathode, having portions converging to a point whose cross sectional area is a minimum compared to said converging portions.

3. An X-ray tube as claimed in claim 1 designed to carry a current which is equal to the $n$th power of the voltage applied where $n$ is a constant depending upon the apex angle of the filamentary cathode.

4. In a discharge device the combination with a highly evacuated vessel of an anode with a great active area and a filamentary cathode having portions extending to a point where the heating is a maximum compared to said extending portions, the discharge device being designed to carry a current which is equal to the $n$th power of the voltage applied where $n$ is a constant depending upon the apex angle of the filamentary cathode.

5. An X-ray device comprising an enclosing evacuated envelope, an anode and a cathode, said anode comprising an anti-cathode member hollowed out at the place of the focal spot and said cathode having portions converging to a point whose cross sectional area is a minimum compared to said converging portions.

6. An X-ray device comprising an enclosing evacuated envelope, an anode, a cathode and a cathode focusing shield member, said anode comprising an anti-cathode member hollowed out at the place of the focal spot and said cathode having portions converging to a point whose cross-sectional area is a minimum compared to said converging portions, and said shield member being disposed behind the apex of said converging cathode portions.

7. An X-ray device comprising an enclosing evacuated envelope, an anode, a cathode, and a cathode focusing shield member, said anode comprising an anti-cathode member hollowed out at the place of the focal spot, said hollowed out portion having a part thereof of sharp curvature and another part of relatively little curvature, and said cathode having portions converging to a point whose cross-sectional area is a minimum compared to said converging portions, and said shield member being disposed behind the apex of said converging cathode portions.

In testimony whereof, I have hereunto subscribed my name this 8th day of September, 1930.

ARTHUR MUTSCHELLER.